US012568391B2

(12) United States Patent
Wang et al.

(10) Patent No.: US 12,568,391 B2
(45) Date of Patent: Mar. 3, 2026

(54) ORTHOGONALIZATION OF A COMPRESSED CHANNEL STATE INFORMATION REPORT

(71) Applicant: QUALCOMM Incorporated, San Diego, CA (US)

(72) Inventors: Runxin Wang, San Diego, CA (US); Renqiu Wang, San Diego, CA (US); Abdelrahman Mohamed Ahmed Mohamed Ibrahim, San Diego, CA (US); Pavan Kumar Vitthaladevuni, San Diego, CA (US); Jay Kumar Sundararajan, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/308,076

(22) Filed: Apr. 27, 2023

(65) Prior Publication Data

US 2024/0365149 A1     Oct. 31, 2024

(51) Int. Cl.
| | |
|---|---|
| *H04W 24/10* | (2009.01) |
| *H04L 5/00* | (2006.01) |
| *H04L 25/02* | (2006.01) |

(52) U.S. Cl.
CPC ........... *H04W 24/10* (2013.01); *H04L 5/0007* (2013.01); *H04L 25/0224* (2013.01)

(58) Field of Classification Search
CPC .. H04W 24/10; H04L 5/0007; H04L 25/0224; H04L 25/0254
See application file for complete search history.

(56) References Cited

U.S. PATENT DOCUMENTS

2018/0254868 A1* 9/2018 Saito ..................... H04L 5/0048

FOREIGN PATENT DOCUMENTS

WO      2022271073 A1   12/2022

OTHER PUBLICATIONS

Vivo ("Other Aspects on Al/ML for CSI Feedback Enhancement", 3GPP TSG RAN WG1 #112bis-e, R1-2302478, Apr. 7, 2023) (Year: 2023).*
International Search Report and Written Opinion—PCT/US2024/017492—ISA/EPO—Jul. 15, 2024.

(Continued)

*Primary Examiner* — Jamal Javaid
(74) *Attorney, Agent, or Firm* — Harrity & Harrity, LLP

(57)     ABSTRACT

Various aspects of the present disclosure generally relate to wireless communication. In some aspects, a user equipment (UE) may receive one or more channel state information (CSI)-reference signals (RSs). The UE may transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node. Numerous other aspects are described.

30 Claims, 10 Drawing Sheets

(56) References Cited

OTHER PUBLICATIONS

Moderator (Huawei): "Summary#3 for [112bis-e-R18-AI/ML-02]", 3GPP TSG-RAN WG1 Meeting #112bis-e, R1-2303990, 3rd Generation Partnership Project, Mobile Competence Centre, 650, Route Des Lucioles, F-06921, Sophia-Antipolis Cedex, France, vol. RAN WG1, No. e-Meeting, Apr. 17, 2023-Apr. 26, 2023, Apr. 21, 2023, 290 Pages, XP052462206, p. 41-p. 42.
VIVO: "Other Aspects on AI/ML for CSI Feedback Enhancement", 3GPP TSG RAN WG1 #112bis-e, R1-2302478, 3rd Generation Partnership Project, Mobile Competence Centre, 650, Route Des Lucioles, F-06921, Sophia-Antipolis Cedex, France, vol. 3GPP RAN 1, No. Online, Apr. 17, 2023-Apr. 26, 2023, Apr. 7, 2023, XP052293050, 19 Pages, section 2.1.5 and section 2.1.6.

* cited by examiner

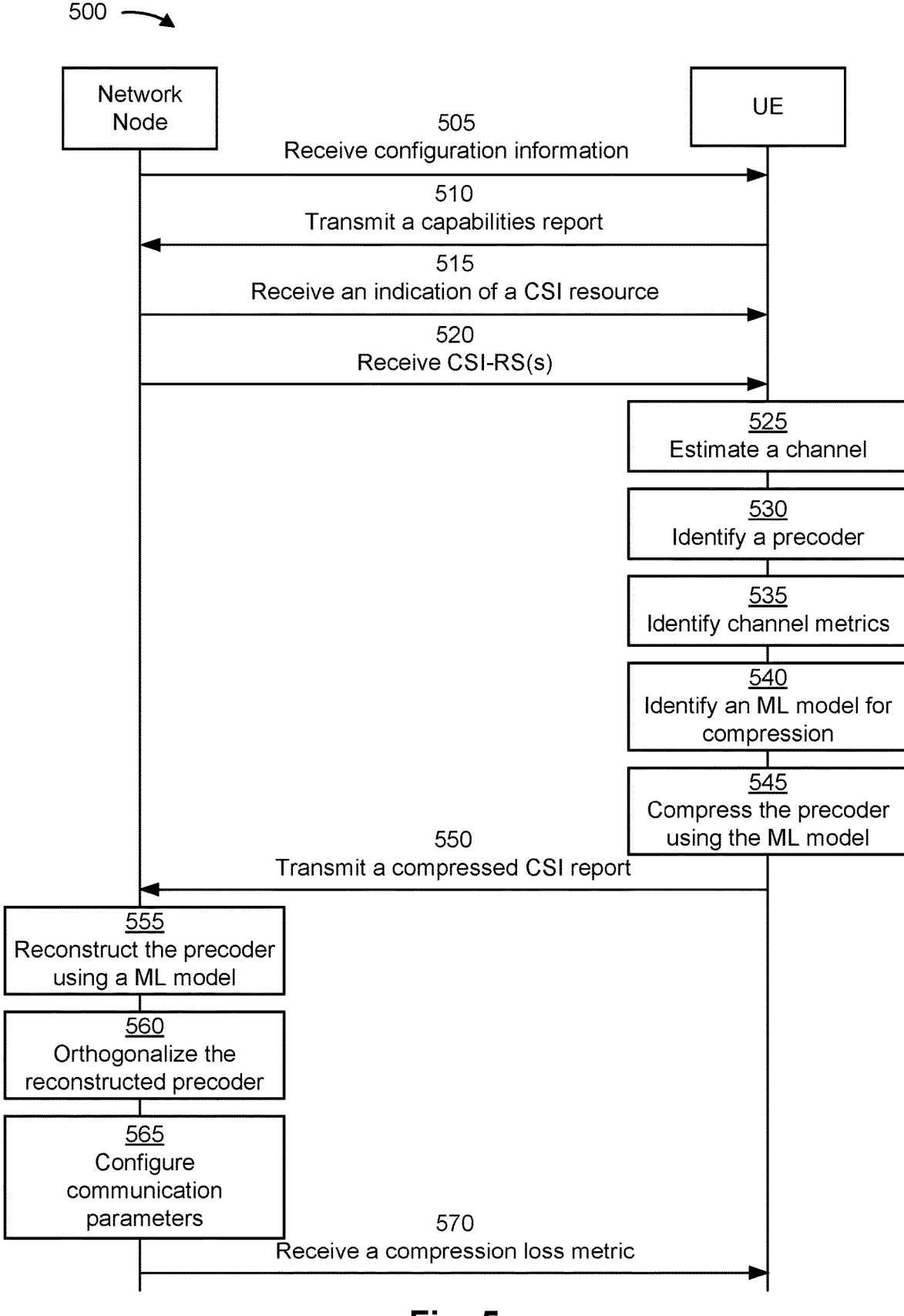

500

| Network Node | | UE |
| --- | --- | --- |

505
Receive configuration information

510
Transmit a capabilities report

515
Receive an indication of a CSI resource

520
Receive CSI-RS(s)

525
Estimate a channel

530
Identify a precoder

535
Identify channel metrics

540
Identify an ML model for compression

545
Compress the precoder using the ML model

550
Transmit a compressed CSI report

555
Reconstruct the precoder using a ML model

560
Orthogonalize the reconstructed precoder

565
Configure communication parameters

570
Receive a compression loss metric

Fig. 5

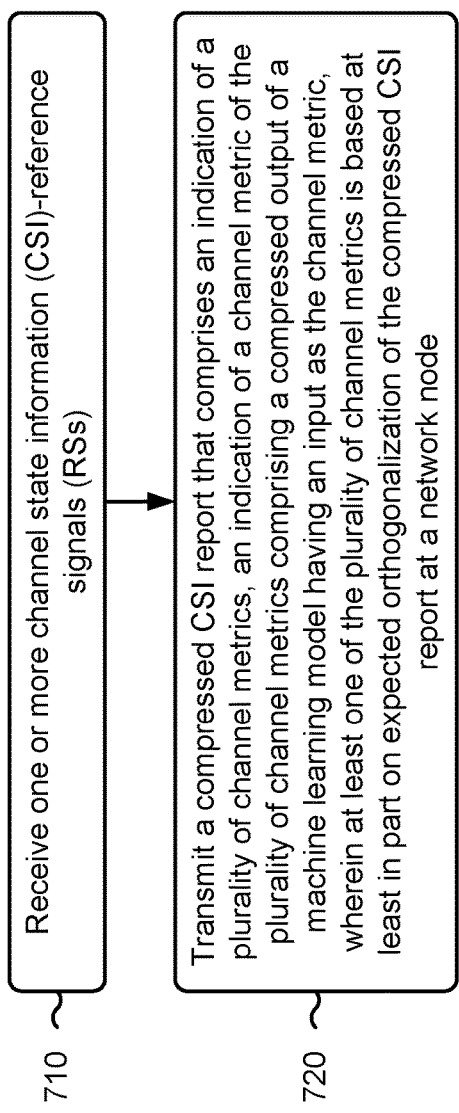

700

710 — Receive one or more channel state information (CSI)-reference signals (RSs)

720 — Transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node

FIG. 7

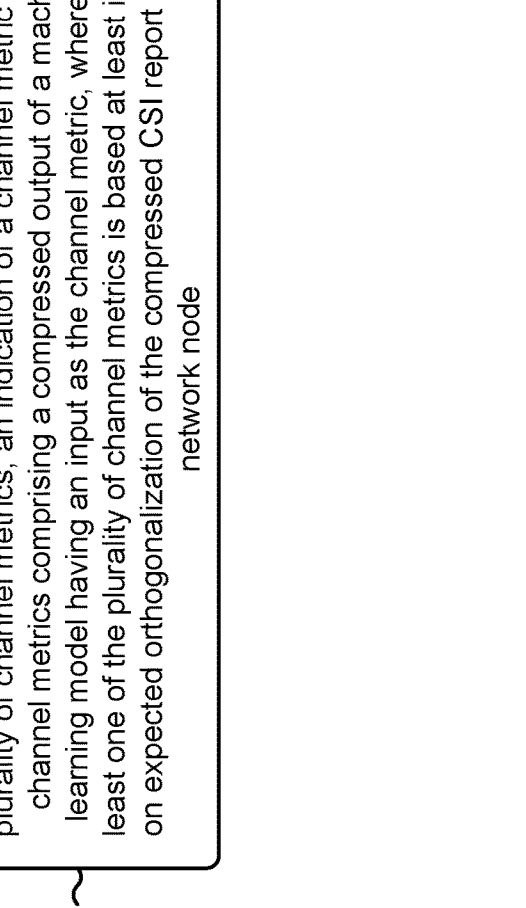

Transmit one or more channel state information (CSI)-reference signals (RSs)

810

Receive a compressed CSI report that comprises an indication of a plurality of channel metrics, an indication of a channel metric of the channel metrics comprising a compressed output of a machine learning model having an input as the channel metric, wherein at least one of the plurality of channel metrics is based at least in part on expected orthogonalization of the compressed CSI report at the network node

ORTHOGONALIZATION OF A COMPRESSED CHANNEL STATE INFORMATION REPORT

FIELD OF THE DISCLOSURE

Aspects of the present disclosure generally relate to wireless communication and to techniques and apparatuses for orthogonalization of a compressed channel state information report.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving one or more channel state information (CSI)-reference signals (RSs). The method may include transmitting a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node.

Some aspects described herein relate to a method of wireless communication performed by a network node. The method may include transmitting one or more CSI-RSs. The method may include receiving a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node.

Some aspects described herein relate to a UE for wireless communication. The user equipment may include a memory and one or more processors coupled to the memory. The one or more processors may be configured to receive one or more CSI-RSs. The one or more processors may be configured to transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node.

Some aspects described herein relate to a network node for wireless communication. The network node may include a memory and one or more processors coupled to the memory. The one or more processors may be configured to transmit one or more CSI-RSs. The one or more processors may be configured to receive a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node.

Some aspects described herein relate to a non-transitory computer-readable medium that stores a set of instructions for wireless communication by a UE. The set of instructions, when executed by one or more processors of the UE, may cause the UE to receive one or more CSI-RSs. The set of instructions, when executed by one or more processors of the UE, may cause the UE to transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node.

Some aspects described herein relate to a non-transitory computer-readable medium that stores a set of instructions for wireless communication by a network node. The set of instructions, when executed by one or more processors of the network node, may cause the network node to transmit one or more CSI-RSs. The set of instructions, when executed by one or more processors of the network node, may cause the network node to receive a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node.

Some aspects described herein relate to an apparatus for wireless communication. The apparatus may include means for receiving one or more CSI-RSs. The apparatus may include means for transmitting a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node.

Some aspects described herein relate to an apparatus for wireless communication. The apparatus may include means for transmitting one or more CSI-RSs. The apparatus may include means for receiving a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram of an example associated with orthogonalization of a compressed CSI report, in accordance with the present disclosure.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Figure 1:
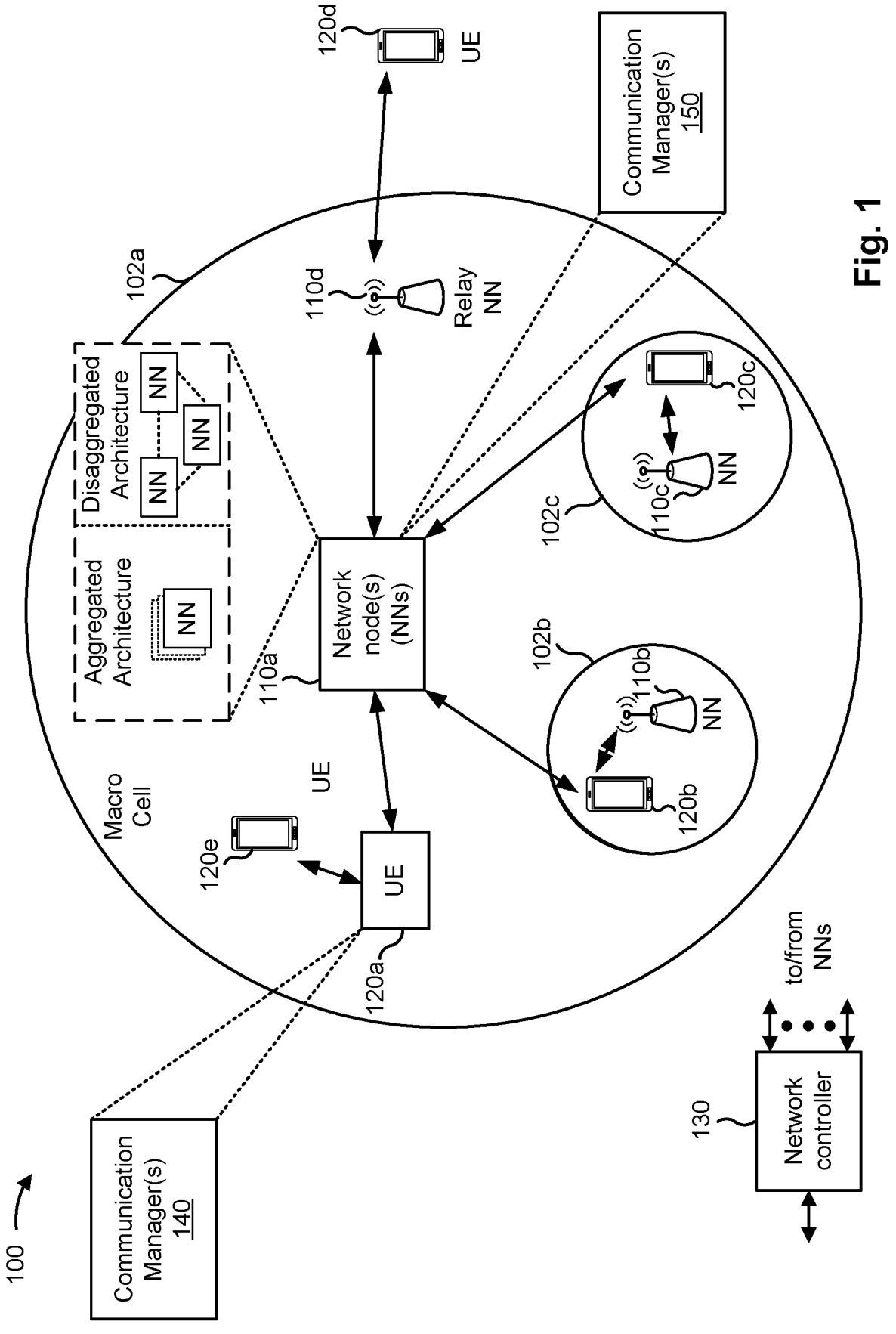
FIG. 1 is a diagram illustrating an example of a wireless network, in accordance with the present disclosure.

In some networks, a network node may transmit, and a user equipment (UE) may receive, channel state information (CSI) reference signals (CSI-RSs) for the UE to use to measure channel metrics and/or estimate a channel. The UE may transmit a CSI report to indicate the channel metrics and/or channel estimation to the network node, which the network node may use to identify communication parameters for communicating with the UE.

In beamforming-based communications and/or for communications using relatively high frequency ranges (e.g., frequency ranges that are higher than 2 GHZ, sub-6 GHz frequency ranges, or sub-THz frequency ranges, among other examples), channel metrics may change more frequently than for relatively low frequency ranges. Additionally, or alternatively, a channel may change more frequently than for low frequency ranges or omnidirectional communications. For example, higher frequency communications may have narrower beams, which may correspond to rapid changes in channel metrics or a channel estimate with UE movement or changes to an environment.

To account for rapid changes in channel metrics or a channel estimate, CSI-RSs may be transmitted with a shorter periodicity, the UE may transmit CSI reports with a shorted periodicity, and/or content of the CSI report may include additional information. However, each of these may result in consumption of network resources that may have otherwise been used to increase an amount of data communicated between the network node and the UE.

Various aspects relate generally to orthogonalization of a compressed CSI report. Some aspects more specifically relate to a UE transmitting a compressed CSI report to a network node and the network node performing orthogonalization of the compressed CSI report. In some examples, the UE may include CSI that is based at least in part on channel metrics associated with expected orthogonalization of the CSI at the network node. In some aspects, the UE may include an indication of a precoder within the CSI report. The precoder may be associated with an expected orthogonalization of the precoder after compression at the UE and reconstruction at the network node.

Particular aspects of the subject matter described in this disclosure can be implemented to realize one or more of the following potential advantages. In some examples, by the network node orthogonalizing a reconstruction of a precoder or other information of a compressed CSI report, the network node may improve information of the CSI to use for selection of communication parameters for communicating with a UE. In this way, the network node may improve spectral efficiency and/or reduce error rates of communications with the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an CNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (cMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive one or more channel state information (CSI)-reference signals (RSs); and transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node. Additionally, or alternatively, the communication manager 140 may perform one or more other operations described herein.

In some aspects, the network node 110 may include a communication manager 150. As described in more detail elsewhere herein, the communication manager 150 may transmit one or more CSI-RSs; and receive a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node. Additionally, or alternatively, the communication manager 150 may perform one or more other operations described herein.

As indicated above, FIG. 1 is provided as an example. Other examples may differ from what is described with regard to FIG. 1.

Figure 2:
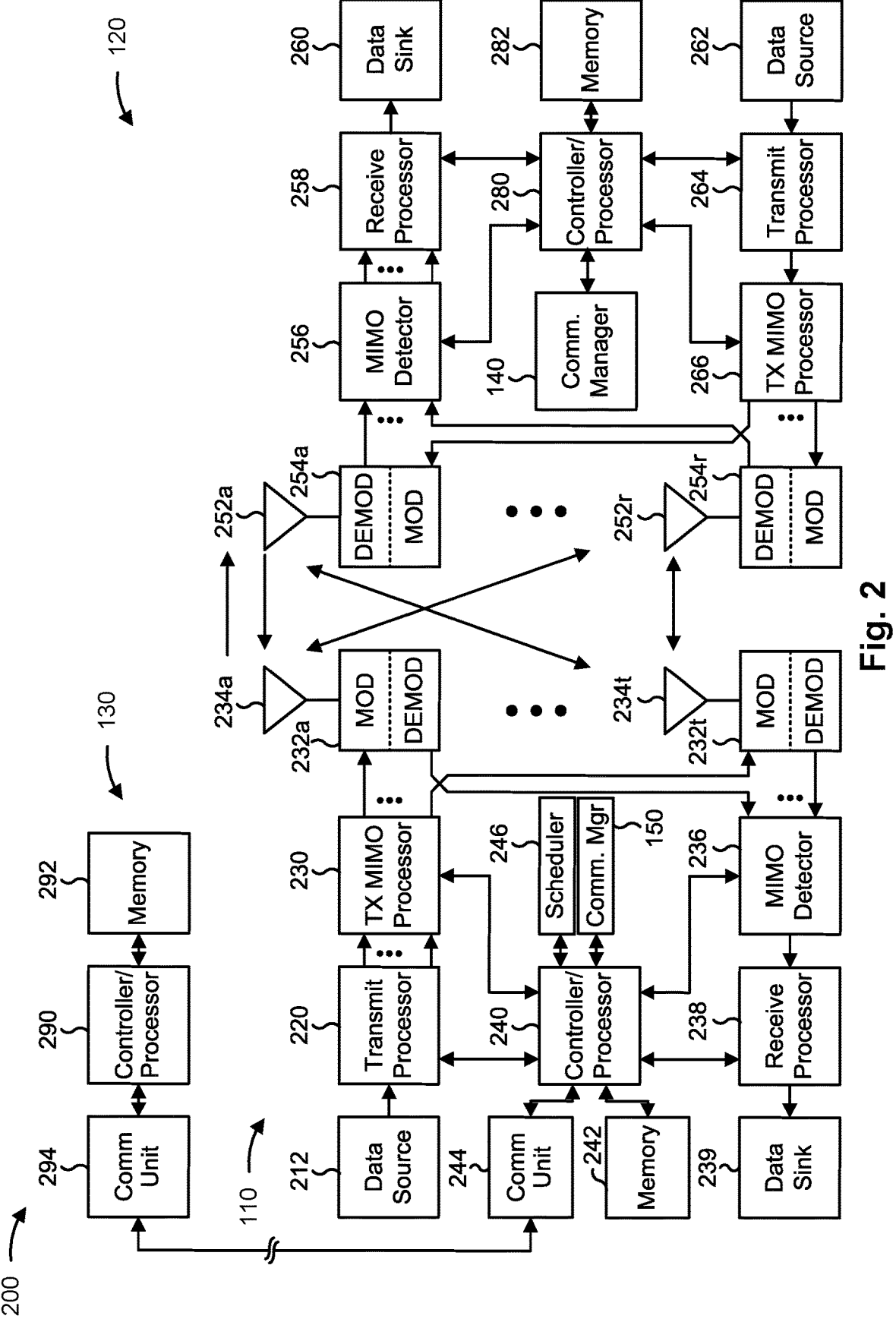
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with orthogonalization of a compressed CSI report, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving one or more CSI-RSs; and/or means for transmitting a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting one or more CSI-RSs; and/or means for receiving a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
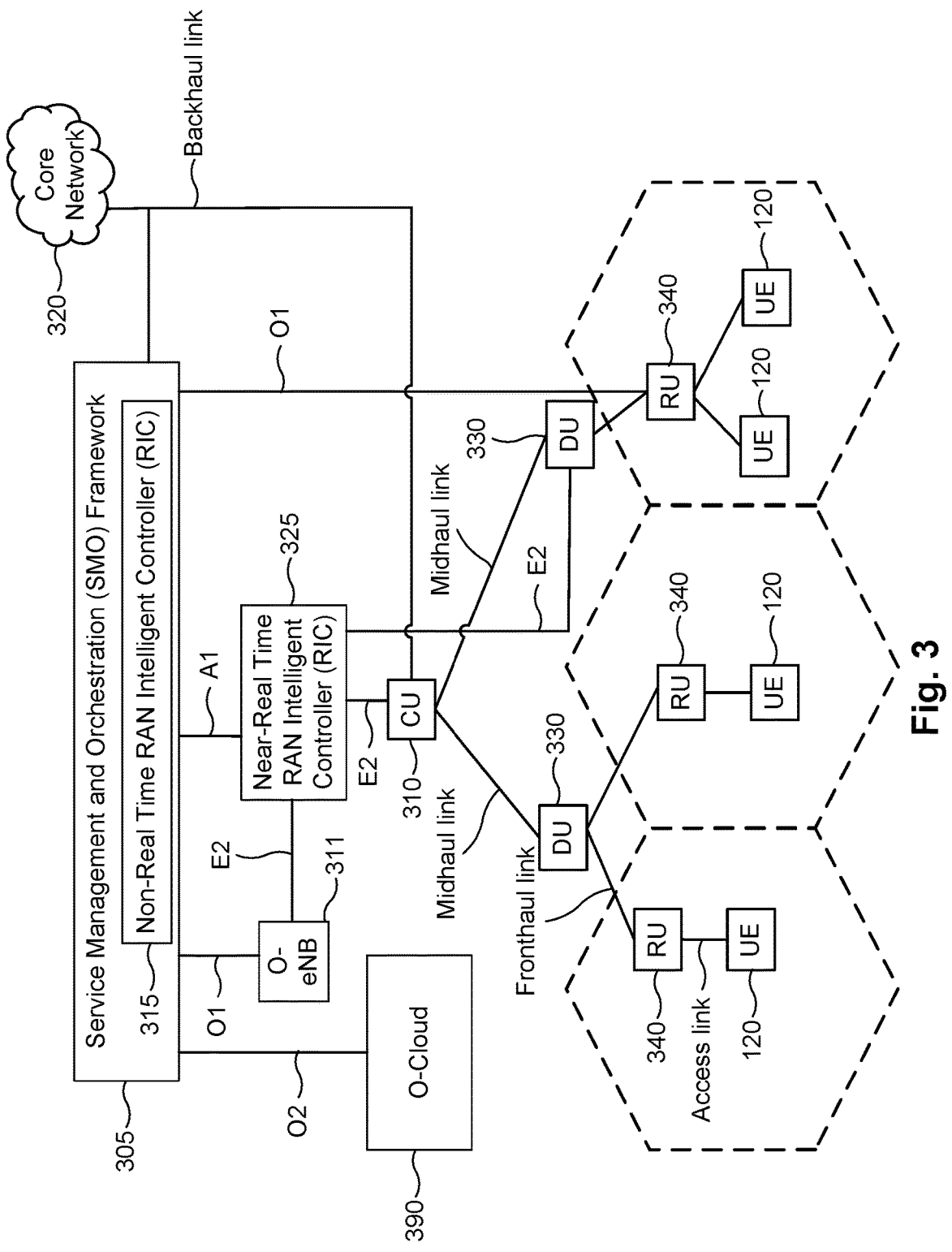
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
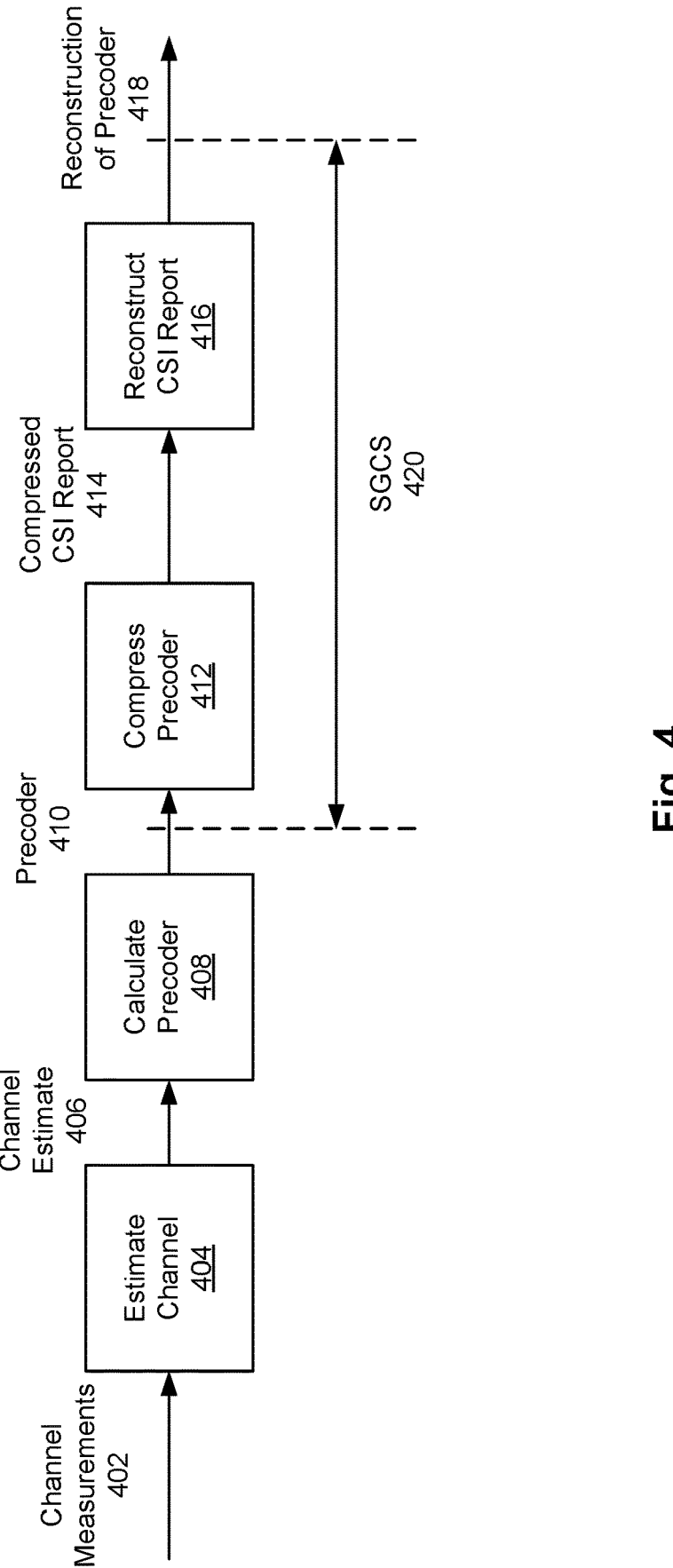
FIG. 4 is a diagram of an example associated with compression of a precoder associated with a channel estimate, in accordance with the present disclosure.

FIG. 4 is a diagram of an example 400 associated with compression of a precoder associated with a channel estimate, in accordance with the present disclosure. In the context of FIG. 4, a UE (e.g., UE 120) may communicate with a network node (e.g., network node 110) via a wireless network (e.g., wireless network 100).

As shown in FIG. 4, a UE may obtain channel measurements 402. For example, the UE may obtain the channel measurements 402 based at least in part on measuring one or more CSI-RSs. As shown by reference number 404, the UE may estimate a channel associated with the channel measurements 402. For example, the UE may obtain a channel estimate that is represented as a matrix with entries associated with reception parameters for different frequencies and/or times as measured from the one or more CSI-RSs.

As shown in FIG. 4, the UE may generate a channel estimate 406 based at least in part on estimating a channel. As shown by reference number 408, the UE may calculate a precoder associated with the channel estimate 406. For example, the UE may perform singular value decomposition (SVD) using the channel estimate to obtain the precoder.

The UE may generate a precoder 410 as an input to an encoder based at least in part on calculating the precoder. As shown by reference number 412, the UE may compress the precoder. In some examples, the UE may use a machine learning model to compress the precoder 410. For example, the UE may use a neural network to compress the precoder.

The UE may transmit a compressed CSI report 414 (e.g., a machine-learning-based CSI report) to a network node. As shown by reference number 416, the network node may reconstruct the CSI report. Based at least in part on reconstructing the CSI report, the UE may generate a reconstruction of the precoder 418.

The reconstruction of the precoder 418 may have errors relative to the precoder 410 based at least in part on compression and reconstruction processes. In some examples, the network node may transmit an indication of error, such as a squared generalized cosine similarity (SGCS) 420, to the UE.

As indicated above, FIG. 4 is provided as an example. Other examples may differ from what is described with regard to FIG. 4.

Using compression and reconstruction of the CSI to communicate a CSI report may improve an amount of overhead consumed in a reporting procedure. However, compression and reconstruction of the CSI report and/or information within the CSI report may result in errors in the reconstructed CSI report. Errors in the CSI report may cause the network node to select communication parameters associated with lower spectral efficiency and/or higher error rates than communication parameters selected without the errors in the CSI report.

In some aspects herein a network node may orthogonalize a reconstruction of a CSI report (e.g., one or more information elements of the CSI report). For example, the network node may reconstruct a precoder of the CSI report to obtain a reconstruction of the precoder, and the network node may perform orthogonalization to restore orthogonality of the precoder that may have otherwise been lost in a compression (at the UE) and reconstruction (at the network node) procedure. In some aspects, the orthogonalization may include performing singular value decomposition (SVD), a Gram-Schmidt procedure, a signal-to-leakage ratio (SLR) procedure, among other algorithms or procedures, or a combination of multiple algorithms or procedures.

The UE may take into account that the network node is configured to perform orthogonalization when calculating a rank index (RI) or channel quality indicator (CQI). For example, the UE may use an orthogonalized precoder to calculate RI or CQI, or may use another RI or CQI algorithm to directly output RI or CQI corresponding to the orthogonalized precoder expected to be generated by the network node.

In some aspects, the network node may transmit an indication of whether the network node is to apply orthogonalization (e.g., to configure the UE for selection of RI or CQI). In some aspects, the UE may transmit an indication of whether the UE supports RI or CQI calculations that are based at least in part on orthogonalization at the network node (e.g., together with an orthogonalization algorithm). In some aspects, the CSI report (e.g., channel state feedback (CSF)) is based at least in part on an estimated or calculated matrix (V-out) if no orthogonalization is to be performed at the network node, or a modified matrix (V'-out) if orthogonalization is to be performed at the network node.

In some aspects, the UE and the network node may consider orthogonalization at the network node during training of a machine learning (ML) model for compression at the UE and a ML model for reconstruction at the network node. For example, the ML models may include associated neural networks that are configured to support reconstruction at the network node after compression at the UE.

In some aspects, the network node may use an orthogonalization layer to output an orthogonalized precoder (e.g., from the CSI report). The orthogonalization layer may be learned and/or trained together other layers of the ML model.

Alternatively, the orthogonalization layer may be a stand-alone procedure without ML. In some aspects, neural network loss (e.g., squared generalized cosine similarity (SGCS) or generalized cosine similarity (GCS)) may be calculated using an orthogonalized precoder.

When the UE calculates RI and/or CQI, the UE may consider orthogonalization at the network node. For example, the UE may use an orthogonalized precoder to calculate RI and/or CQI, or may use other RI or CQI algorithms to directly output RI and/or CQI corresponding to the orthogonalized precoder. In some aspects, the UE may calculate RI and/or CQI based at least in part on an expected orthogonalization at the network node and may not calculate a precoder based at least in part on the expected orthogonalization at the network node. In some aspects, the UE may calculate a precoder and the RI and/or CQI based at least in part on the expected orthogonalization at the network node.

In some aspects, the network node may configure whether orthogonalization will be used at the network node and/or which orthogonalization algorithm is used. In some aspects, a quantization layer (e.g., a structure and/or parameters) may be shared from the network node to the UE to the UE can use the orthogonalization algorithm to account for orthogonalization at the network node when identifying RI and/or CQI or other CSI. In some aspects, the UE may transmit an indication of a capability of the UE to identify or calculate RI and/or CQI based at least in part on orthogonalization at the network node (e.g., expected orthogonalization at the network node) and/or an algorithm used to perform the reorthogonalization.

In some aspects, the UE and the network node may train ML models for compression and reconstruction, with the ML models trained using a non-optimal precoder. For example, after obtaining a precoder (e.g., V-in), the UE may apply orthogonalization to obtain a modified precoder (e.g., V'-in), which is used for neural network training. In some aspects, the orthogonalization algorithm may include performing SVD, a Gram-Schmidt procedure, an SLR procedure, among other algorithms or procedures, or a combination of multiple algorithms or procedures.

Based at least in part on the network node orthogonalizing a reconstruction of a precoder or other information of a compressed CSI report, the network node may improve information of the CSI to use for selection of communication parameters for communicating with a UE. In this way, the network node may improve spectral efficiency and/or reduce error rates of communications with the UE. Based at least in part on the UE accounting for orthogonalization of CSI of the compressed CSI report, the UE may further improve the information of the CSI to use for selection of the communication parameters for communicating with the network node.

FIG. 5 is a diagram of an example 500 associated with orthogonalization of a compressed CSI report, in accordance with the present disclosure. As shown in FIG. 5, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5.

As shown by reference number 505, the network node may transmit, and the UE may receive, configuration information. In some aspects, the UE may receive the configuration information via one or more of radio resource control (RRC) signaling, one or more MAC CEs, and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to compress CSI reports using a machine learning model, such as a neural network. In some aspects, the machine learning model may be associated with an additional neural network at the network node that is configured to reconstruct information compressed by the neural network at the UE. In some aspects, the configuration information may indicate that the UE is to identify CSI based at least in part on expected orthogonalization of the CSI at the network node. For example, the configuration information may indicate that the UE is to identify RI and/or CQI based at least in part on the expected orthogonalization of the CSI at the network node.

The UE may configure itself based at least in part on the configuration information. In some aspects, the UE may be configured to perform one or more operations described herein based at least in part on the configuration information.

As shown by reference number 510, the UE may transmit, and the network node may receive, a capabilities report. In some aspects, the capabilities report may indicate UE support for compressing a CSI report. In some aspects, the capabilities report may indicate support for identifying CSI based at least in part on expected orthogonalization of the CSI report at the network node. In some aspects, the UE may indicate supported neural networks or other machine learning models that the UE can use to compress the CSI report and/or information within the CSI report.

In some aspects, the UE may transmit an indication of support for transmitting the compressed CSI report that comprises the at least one of the plurality of channel metrics that is based at least in part on expected orthogonalization of the CSI at the network node. In some aspects, the UE may, based at least in part on transmitting the indication of support, identify channel metrics for CSI that are based at least in part on expected orthogonalization of the CSI at the network node.

As shown by reference number 515, the UE may receive, and the network node may transmit, an indication of a CSI resource to use for reception of one or more CSIs. In some aspects, the CSI resource may be a dynamic resource, a semi-persistent (e.g., activated) resource, or a periodic (e.g., configured) resource, among other examples.

In some aspects, the network node may indicate (e.g., within the indication of the CSI resource, the configuration information, or another communication) that the network node is to perform orthogonalization of the CSI. In some aspects, the UE may, based at least in part on receiving the indication that the network node is to perform orthogonalization of the CSI, identify channel metrics for CSI that are based at least in part on expected orthogonalization of the CSI at the network node.

As shown by reference number 520, the UE may receive, and the network node may transmit, one or more CSI-RSs. The one or more CSI-RSs may be associated with the CSI resource indicated in connection with reference number 515. In some aspects, the UE may receive the CSI-RSs as dynamically scheduled CSI-RSs, periodic CSI-RSs, or semi-persistent CSI-RSs.

As shown by reference number 525, the UE may estimate a channel. For example, the UE may estimate a channel for communications with the network node based at least in part on measurements of the one or more CSI-RSs.

As shown by reference number 530, the UE may identify a precoder associated with communications with the network node. For example, the precoder may be based at least in part on a channel estimate and/or measurements of the one or more CSI-RSs. In some aspects, the precoder may be based at least in part on expected orthogonalization of the CSI at the network node. In some aspects, the UE may identify the precoder based at least in part on performing orthogonalization on one or more candidate precoders to identify an estimated orthogonalized output of the one or more candidate precoders. In some aspects, the precoder may be a non-optimal precoder based at least in part on identifying an estimated orthogonalization output of a reconstruction of candidate precoders at the network node.

As shown by reference number 535, the UE may identify one or more channel metrics. For example, the UE may identify CQI and/or RI to indicate to the network node within a CSI report along with the precoder. In some aspects, the CQI and/or the RI may be based at least in part on an estimation of reconstruction of the compressed CSI report by the network node.

In some aspects, the UE may identify the precoder and/or the channel metrics based at least in part on expected orthogonalization at the network node. For example, the UE may identify the channel metrics (e.g., CQI or RI, among other examples) based at least in part on an expectation that the network node is to perform an orthogonalization procedure on the CSI after reconstruction at the network node. In some aspects, the UE may identify or select the channel metrics (e.g., CQI or RI, among other examples) based at least in part on performing orthogonalization on one or more candidate precoders to identify an estimated orthogonalized output of the one or more candidate precoders.

As shown by reference number 540, the UE may identify an ML model for compression. For example, the UE may identify the ML model from a set of candidate ML models. In some aspects, the UE may select the ML model autonomously or may receive an indication to use the ML model from the network node, among other examples. In some aspects, the ML model may be associated with an additional ML model at the network node. In some aspects, association of the ML model with the additional ML model supports reconstruction of compressed information by the network node using the additional ML model.

As shown by reference number 545, the UE may compress the precoder using the ML model. For example, the UE may provide the precoder as an input to the ML model (e.g., a neural network) to compress the precoder. Based at least in part on the precoder being compressed, the precoder may be indicated with a reduced number of bits.

As shown by reference number 550, the UE may transmit, and the network node may receive, a compressed CSI report. For example, the UE may transmit the compressed CSI report via a MAC CE or other layer 2 signaling. In some aspects, the compressed CSI report may be a compressed CSI report based at least in part on including information that is compressed using the ML model.

In some aspects, the compressed CSI report may include a compressed output of an ML model (e.g., an encoder output) having an input of channel metrics for CSI that are based at least in part on expected orthogonalization of the CSI at the network node. For example, the UE may identify the channel metrics based at least in part on an expectation that the network node will perform orthogonalization (e.g., after reconstruction) of the CSI transmitted to the network node as the compressed CSI report. In some aspects, the channel metrics may include indications of a precoder associated with receiving the one or more CSI-RSs, a CQI, and/or an RI, among other examples. In some aspects, the indication of the ML model may include an ML model identifier that identifies the ML model from a set of candidate ML models that could be used to compress the precoder.

As shown by reference number 555, the network node may reconstruct the precoder that is compressed by the UE and/or other information of the CSI report. In some aspects, the network node may, for reconstructing the precoder or other information of the CSI report, use an ML model associated with the ML model used at the UE to compress the CSI report.

As shown by reference number 560, the network node may orthogonalize the reconstructed precoder. In some aspects, the network node may use a singular value decomposition (SVD), a Gram-Schmidt procedure, a signal-to-leakage ratio (SLR) procedure, among other algorithms or procedures, or a combination of multiple algorithms or procedures to orthogonalize the reconstructed precoder or other information of the CSI.

In some aspects, the network node may perform an orthogonalization procedure within the ML model described in connection with reference number 555. Alternatively, the network node may perform the orthogonalization procedure on an output of the additional machine learning model at the network node (e.g., outside of the ML model).

As shown by reference number 565, the network node may configure communication parameters for communication with the UE and based at least in part on the reconstructed and orthogonalized precoder.

As shown by reference number 570, the UE may receive, and the network node may transmit, an indication of a compression loss metric (e.g., SGCS or GCS, among other examples). In some aspects, the compression loss metric indicates compression loss between compression and reconstruction of the CSI report or between the compression and orthogonalization of the CSI report.

Based at least in part on the UE providing a CSI report as a compressed CSI report via L2 signaling, the described techniques can be used to conserve communication resources that may have otherwise been used to transmit an uncompressed CSI report via L1 signaling. Additionally, or alternatively, based at least in part on conserving the communication resources, the UE may provide the compressed CSI report with a smaller periodicity, which may support additional updates to communication parameters, which may improve spectral efficiency and/or reduce error rates.

As indicated above, FIG. 5 is provided as an example. Other examples may differ from what is described with respect to FIG. 5.

Figure 6:
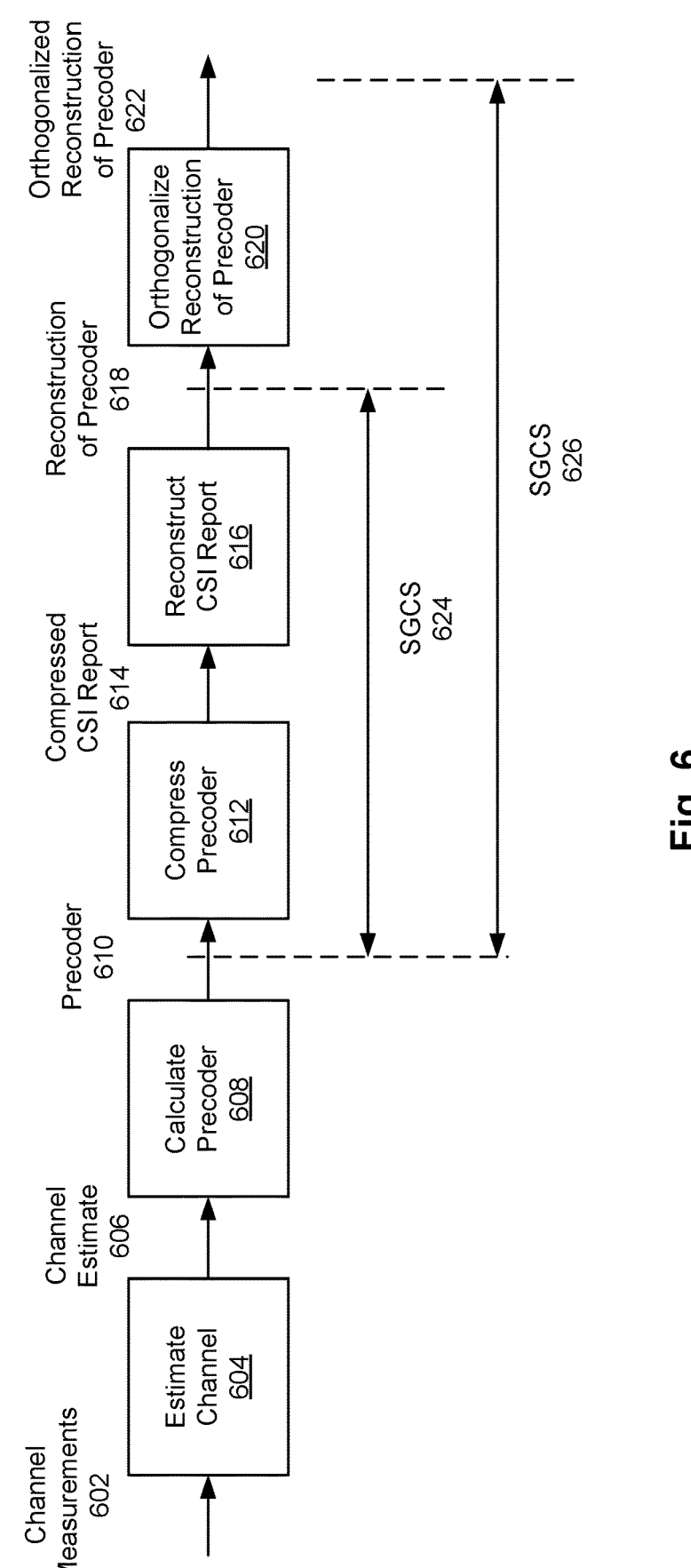
FIG. 6 is a diagram of an example associated with compression of a precoder associated with a channel estimate, in accordance with the present disclosure.

FIG. 6 is a diagram of an example 600 associated with compression of a precoder associated with a channel estimate, in accordance with the present disclosure. In the context of FIG. 6, a UE (e.g., UE 120) may communicate with a network node (e.g., network node 110) via a wireless network (e.g., wireless network 100.

As shown in FIG. 6, a UE may obtain channel measurements 602. For example, the UE may obtain the channel measurements 602 based at least in part on measuring one or more CSI-RSs. As shown by reference number 604, the UE may estimate a channel associated with the channel measurements 602. For example, the UE may obtain a channel estimate that is represented as a matrix with entries associated with reception parameters for different frequencies and/or times as measured from the one or more CSI-RSs.

As shown in FIG. 6, the UE may generate a channel estimate 606 based at least in part on estimating a channel. As shown by reference number 608, the UE may calculate a precoder associated with the channel estimate 606. For example, the UE may perform singular value decomposition (SVD) using the channel estimate to obtain the precoder.

The UE may generate a precoder 610 as an input to an encoder based at least in part on calculating the precoder. As shown by reference number 612, the UE may compress the precoder. In some examples, the UE may use a machine learning model to compress the precoder 610. For example, the UE may use a neural network to compress the precoder.

The UE may transmit a compressed CSI report 614 (e.g., a machine-learning-based CSI report) to a network node. As shown by reference number 616, the network node may reconstruct the CSI report. Based at least in part on reconstructing the CSI report, the UE may generate a reconstruction of the precoder 618.

The reconstruction of the precoder 618 may have errors and/or may have demodulation or decoding results that are non-orthogonal. As shown by reference number 620, the network node may orthogonalize the reconstruction of the precoder 618. In this way, the network node may refine or clean the reconstruction of the precoder 618 to improve decoding or demodulation. The network node may generate an orthogonalized reconstruction of the precoder 622 associated with improved decoding and/or demodulation of the CSI.

In some aspects, the UE and the network node may communicate an indication of error (e.g., SGCS or GCS, among other examples) from compression and reconstruction of the precoder. In some examples, the network node may transmit an indication of error, such as an SGCS 624, to indicate the error between the precoder and the reconstruction of the precoder. In some examples, the network node may transmit an indication of error, such as an SGCS 626, to indicate the error between the precoder and the orthogonalization of the reconstruction of the precoder.

As indicated above, FIG. 6 is provided as an example. Other examples may differ from what is described with regard to FIG. 6.

FIG. 7 is a diagram illustrating an example process 700 performed, for example, by a UE, in accordance with the present disclosure. Example process 700 is an example where the UE (e.g., UE 120) performs operations associated with orthogonalization of a compressed CSI report.

As shown in FIG. 7, in some aspects, process 700 may include receiving one or more CSI-RSs (block 710). For example, the UE (e.g., using reception component 902 and/or communication manager 906, depicted in FIG. 9) may receive one or more CSI-RSs, as described above.

As further shown in FIG. 7, in some aspects, process 700 may include transmitting a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node (block 720). For example, the UE (e.g., using transmission component 904 and/or communication manager 906, depicted in FIG. 9) may transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node, as described above.

Process 700 may include additional aspects, such as any single aspect or any combination of aspects described below and/or in connection with one or more other processes described elsewhere herein.

In a first aspect, process 700 includes performing channel estimation based at least in part on the one or more CSI-RSs, and identifying a precoder based at least in part on the channel estimation, wherein the at least one of the plurality of channel metrics for CSI comprises the precoder that is based at least in part on expected orthogonalization of the CSI at the network node.

In a second aspect, alone or in combination with the first aspect, the one or more processors are further configured to identify the precoder based at least in part on performing orthogonalization on one or more candidate precoders to identify an estimated orthogonalized output of the one or more candidate precoders, and selecting one or more of a precoder a RI or a RI based at least in part on the estimated orthogonalized output of the one or more candidate precoders.

In a third aspect, alone or in combination with one or more of the first and second aspects, process 700 includes receiving an indication that the network node is to perform orthogonalization of the CSI, and the at least one of the plurality of channel metrics is based at least in part on expected orthogonalization of the CSI at the network node based at least in part on receiving the indication that the network node is to perform orthogonalization of the CSI.

In a fourth aspect, alone or in combination with one or more of the first through third aspects, process 700 includes transmitting an indication of support for transmitting the compressed CSI report that comprises the at least one of the plurality of channel metrics that is based at least in part on expected orthogonalization of the CSI at the network node, and the at least one of the plurality of channel metrics is based at least in part on expected orthogonalization of the CSI at the network node based at least in part on transmitting the indication of support for transmitting the compressed CSI report that comprises the at least one of the plurality of channel metrics that is based at least in part on expected orthogonalization of the CSI at the network node.

In a fifth aspect, alone or in combination with one or more of the first through fourth aspects, process 700 includes orthogonalization of the compressed CSI report at the network node comprises performance of an orthogonalization procedure, on one or more of the plurality of channel metrics, within an additional machine learning model at the network node, or performance of the orthogonalization procedure, on one or more of the plurality of channel metrics, on an output of the additional machine learning model at the network node.

In a sixth aspect, alone or in combination with one or more of the first through fifth aspects, a compression loss metric comprises an indication of compression loss between compression and reconstruction of the CSI report, or an indication of compression loss between compression and orthogonalization of the CSI report.

In a seventh aspect, alone or in combination with one or more of the first through sixth aspects, the at least one of the plurality of the channel metrics for CSI comprises a precoder.

In an eighth aspect, alone or in combination with one or more of the first through seventh aspects, the precoder is a non-optimal precoder based at least in part on identifying an estimated orthogonalization output of a reconstruction of candidate precoders at the network node.

In a ninth aspect, alone or in combination with one or more of the first through eighth aspects, the machine learning model is associated with an additional machine learning model at a network node, and wherein association of the additional machine learning model to the machine learning model supports reconstruction of the compressed CSI report.

In a tenth aspect, alone or in combination with one or more of the first through ninth aspects, the compressed CSI report comprises one or more of a RI, a RI, or an indication of the machine learning model.

In an eleventh aspect, alone or in combination with one or more of the first through tenth aspects, one or more of the CQI or the RI is associated with an estimation of expected orthogonalization of the compressed CSI report.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with orthogonalization of a compressed CSI report.

As shown in FIG. 8, in some aspects, process 800 may include transmitting one or more CSI-RSs (block 810). For example, the network node (e.g., using transmission component 1004 and/or communication manager 1006, depicted in FIG. 10) may transmit one or more CSI-RSs, as described above.

As further shown in FIG. 8, in some aspects, process 800 may include receiving a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node (block 820). For example, the network node (e.g., using reception component 1002 and/or communication manager 1006, depicted in FIG. 10) may receive a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node, as described above.

Process 800 may include additional aspects, such as any single aspect or any combination of aspects described below and/or in connection with one or more other processes described elsewhere herein.

In a first aspect, process 800 includes generating a reconstruction of a precoder based at least in part on reconstructing the compressed CSI report.

In a second aspect, alone or in combination with the first aspect, process 800 includes generating an orthogonalization of one or more of the reconstruction of the precoder or the at least one of one or more additional channel metrics.

In a third aspect, alone or in combination with one or more of the first and second aspects, generating the orthogonalization of the precoder comprises performance of an orthogonalization procedure, on one or more of the plurality of channel metrics, within an additional machine learning model at the network node, or performance of the orthogonalization procedure, on one or more of the plurality of channel metrics, on an output of the additional machine learning model at the network node.

In a fourth aspect, alone or in combination with one or more of the first through third aspects, process 800 includes transmitting an indication that the network node is to perform orthogonalization of the CSI, and the at least one of the plurality of channel metrics is based at least in part on expected orthogonalization of the CSI at the network node based at least in part on transmitting the indication that the network node is to perform orthogonalization of the CSI.

In a fifth aspect, alone or in combination with one or more of the first through fourth aspects, process 800 includes receiving an indication of support for transmitting the compressed CSI report that comprises the at least one of the plurality of channel metrics that is based at least in part on expected orthogonalization of the CSI at the network node, and the at least one of the plurality of channel metrics is based at least in part on expected orthogonalization of the CSI at the network node based at least in part on receiving the indication of support for transmitting the compressed CSI report that comprises the at least one of the plurality of channel metrics that is based at least in part on expected orthogonalization of the CSI at the network node.

In a sixth aspect, alone or in combination with one or more of the first through fifth aspects, a compression loss metric comprises an indication of compression loss between compression and reconstruction of the CSI report, or an indication of compression loss between compression and orthogonalization of the CSI report.

In a seventh aspect, alone or in combination with one or more of the first through sixth aspects, the at least one of the channel metrics for CSI comprises a precoder.

In an eighth aspect, alone or in combination with one or more of the first through seventh aspects, the precoder is a non-optimal precoder based at least in part on an estimated orthogonalization output of a reconstruction of candidate precoders at the network node.

In a ninth aspect, alone or in combination with one or more of the first through eighth aspects, the machine learning model is associated with an additional machine learning model at the network node, and wherein association of the additional machine learning model to the machine learning model supports reconstruction of the compressed CSI report.

In a tenth aspect, alone or in combination with one or more of the first through ninth aspects, the compressed CSI report comprises one or more of a RI, a RI, or an indication of the machine learning model.

In an eleventh aspect, alone or in combination with one or more of the first through tenth aspects, one or more of the CQI or the RI is associated with an estimation of expected orthogonalization of the compressed CSI report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
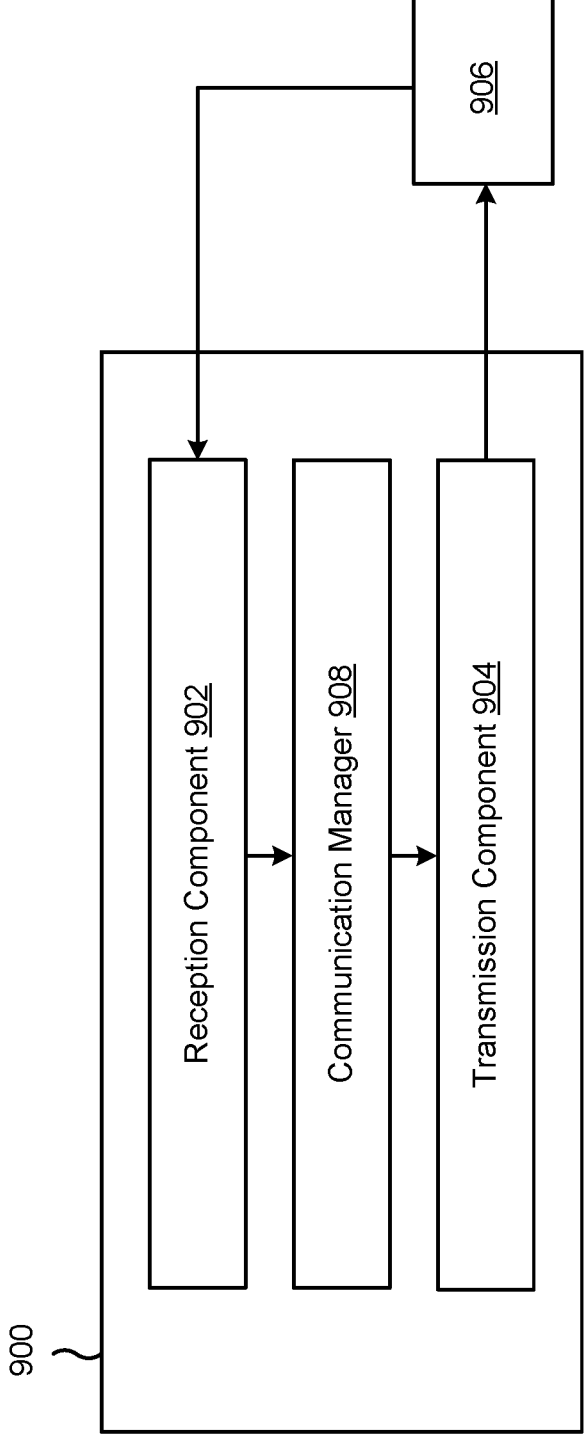
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager

906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive one or more CSI-RSs The transmission component 904 may transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node.

The communication manager 906 may perform channel estimation based at least in part on the one or more CSI-RSs.

The communication manager 906 may identify a precoder based at least in part on the channel estimation wherein the at least one of the plurality of channel metrics for CSI comprises the precoder that is based at least in part on expected orthogonalization of the CSI at the network node.

The reception component 902 may receive an indication that the network node is to perform orthogonalization of the CSI wherein the at least one of the plurality of channel metrics is based at least in part on expected orthogonalization of the CSI at the network node based at least in part on receiving the indication that the network node is to perform orthogonalization of the CSI.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
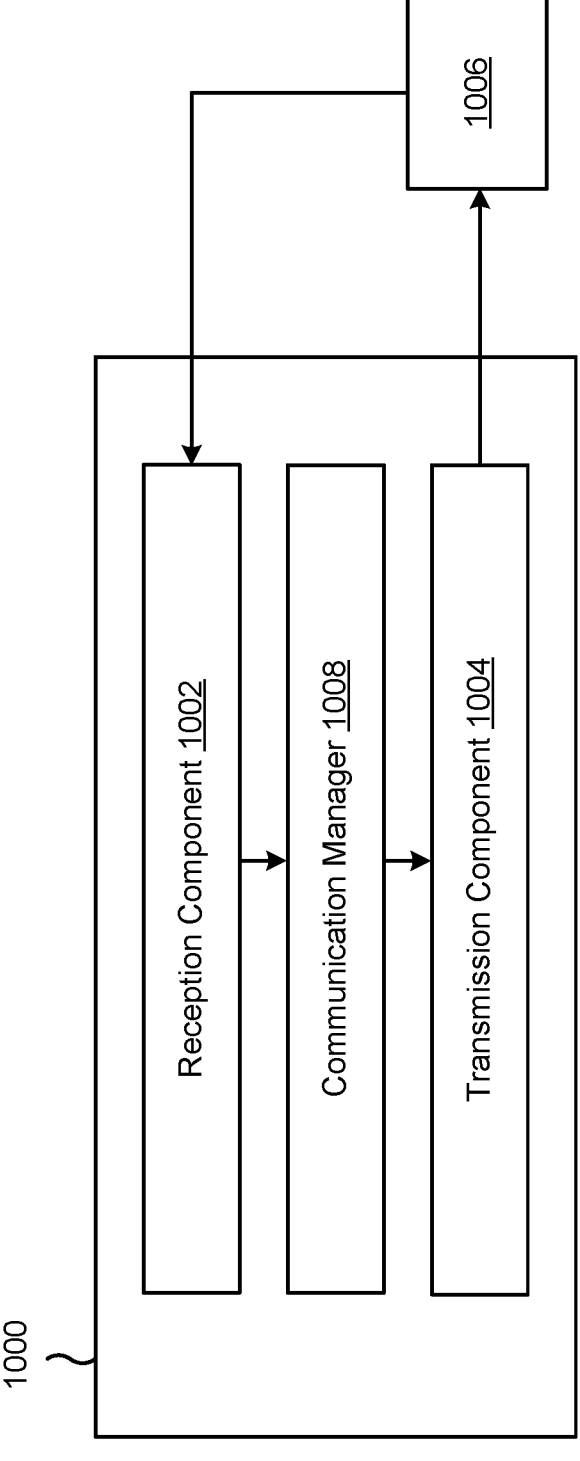
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit one or more CSI-RSs. The reception component 1002 may receive a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node.

The communication manager 1006 may generate a reconstruction of a precoder based at least in part on reconstructing the compressed CSI report.

The communication manager 1006 may generate an orthogonalization of one or more of the reconstruction of the precoder or the at least one of one or more additional channel metrics.

The transmission component 1004 may transmit an indication that the network node is to perform orthogonalization of the CSI wherein the at least one of the plurality of channel metrics is based at least in part on expected orthogonalization of the CSI at the network node based at least in part on transmitting the indication that the network node is to perform orthogonalization of the CSI.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving one or more channel state information (CSI)-reference signals (RSs); and transmitting a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node.

Aspect 2: The method of Aspect 1, further comprising: performing channel estimation based at least in part on the one or more CSI-RSs; and identifying a precoder based at least in part on the channel estimation, wherein the at least one of the plurality of channel metrics for CSI comprises the precoder that is based at least in part on expected orthogonalization of the CSI at the network node.

Aspect 3: The method of Aspect 2, wherein the one or more processors are further configured to identify the precoder based at least in part on: performing orthogonalization on one or more candidate precoders to identify an estimated orthogonalized output of the one or more candidate precoders, and selecting one or more of a precoder, a rank index (RI), or a channel quality indicator (CQI) based at least in part on the estimated orthogonalized output of the one or more candidate precoders.

Aspect 4: The method of any of Aspects 1-3, further comprising receiving an indication that the network node is to perform orthogonalization of the CSI, wherein the at least one of the plurality of channel metrics is based at least in part on expected orthogonalization of the CSI at the network node based at least in part on receiving the indication that the network node is to perform orthogonalization of the CSI.

Aspect 5: The method of any of Aspects 1-4, transmitting an indication of support for transmitting the compressed CSI report that comprises the at least one of the plurality of channel metrics that is based at least in part on expected orthogonalization of the CSI at the network node, wherein the at least one of the plurality of channel metrics is based at least in part on expected orthogonalization of the CSI at the network node based at least in part on transmitting the indication of support for transmitting the compressed CSI report that comprises the at least one of the plurality of channel metrics that is based at least in part on expected orthogonalization of the CSI at the network node.

Aspect 6: The method of any of Aspects 1-5, wherein orthogonalization of the compressed CSI report at the network node comprises: performance of an orthogonalization procedure, on one or more of the plurality of channel metrics, within an additional machine learning model at the network node, or performance of the orthogonalization procedure, on one or more of the plurality of channel metrics, on an output of the additional machine learning model at the network node.

Aspect 7: The method of any of Aspects 1-6, wherein a compression loss metric comprises: an indication of compression loss between compression and reconstruction of the CSI report, or an indication of compression loss between compression and orthogonalization of the CSI report.

Aspect 8: The method of any of Aspects 1-7, wherein the at least one of the plurality of the channel metrics for CSI comprises a precoder.

Aspect 9: The method of Aspect 8, wherein the precoder is a non-optimal precoder based at least in part on identifying an estimated orthogonalization output of a reconstruction of candidate precoders at the network node.

Aspect 10: The method of any of Aspects 1-9, wherein the machine learning model is associated with an additional machine learning model at a network node, and wherein association of the additional machine learning model to the machine learning model supports reconstruction of the compressed CSI report.

Aspect 11: The method of any of Aspects 1-10, wherein the compressed CSI report comprises one or more of: a channel quality indicator (CQI), a rank index (RI), or an indication of the machine learning model.

Aspect 12: The method of Aspect 11, wherein one or more of the CQI or the RI is associated with an estimation of expected orthogonalization of the compressed CSI report.

Aspect 13: A method of wireless communication performed by a network node, comprising: transmitting one or more channel state information (CSI)-reference signals (RSs); and receiving a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the CSI at the network node.

Aspect 14: The method of Aspect 13, further comprising: generating a reconstruction of a precoder based at least in part on reconstructing the compressed CSI report.

Aspect 15: The method of Aspect 14, further comprising: generating an orthogonalization of one or more of the reconstruction of the precoder or the at least one of one or more additional channel metrics.

Aspect 16: The method of Aspect 15, wherein generating the orthogonalization of the precoder comprises: performance of an orthogonalization procedure, on one or more of the plurality of channel metrics, within an additional machine learning model at the network node, or performance of the orthogonalization procedure, on one or more of the plurality of channel metrics, on an output of the additional machine learning model at the network node.

Aspect 17: The method of any of Aspects 13-16, further comprising transmitting an indication that the network node is to perform orthogonalization of the CSI, wherein the at least one of the plurality of channel metrics is based at least in part on expected orthogonalization of the CSI at the network node based at least in part on transmitting the indication that the network node is to perform orthogonalization of the CSI.

Aspect 18: The method of any of Aspects 13-17, receiving an indication of support for transmitting the compressed CSI report that comprises the at least one of the plurality of channel metrics that is based at least in part on expected orthogonalization of the CSI at the network node, wherein the at least one of the plurality of channel metrics is based at least in part on expected orthogonalization of the CSI at the network node based at least in part on receiving the indication of support for transmitting the compressed CSI report that comprises the at least one of the plurality of channel metrics that is based at least in part on expected orthogonalization of the CSI at the network node.

Aspect 19: The method of any of Aspects 13-18, wherein a compression loss metric comprises: an indication of compression loss between compression and reconstruction of the CSI report, or an indication of compression loss between compression and orthogonalization of the CSI report.

Aspect 20: The method of any of Aspects 13-19, wherein the at least one of the channel metrics for CSI comprises a precoder.

Aspect 21: The method of Aspect 20, wherein the precoder is a non-optimal precoder based at least in part on an estimated orthogonalization output of a reconstruction of candidate precoders at the network node.

Aspect 22: The method of any of Aspects 13-21, wherein the machine learning model is associated with an additional machine learning model at the network node, and wherein association of the additional machine learning model to the machine learning model supports reconstruction of the compressed CSI report.

Aspect 23: The method of any of Aspects 13-22, wherein the compressed CSI report comprises one or more of: a channel quality indicator (CQI), a rank index (RI), or an indication of the machine learning model.

Aspect 24: The method of Aspect 23, wherein one or more of the CQI or the RI is associated with an estimation of expected orthogonalization of the compressed CSI report.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive one or more channel state information (CSI)-reference signals (RSs); and
transmit a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node, wherein the compressed output of the machine learning model comprises a compressed precoder, and wherein the orthogonalization of the compressed CSI report restores orthogonality of the compressed precoder.

2. The UE of claim 1, wherein the one or more processors are further configured to:
perform channel estimation based at least in part on the one or more CSI-RSs; and
identify a precoder based at least in part on the channel estimation, wherein the at least one of the plurality of channel metrics for CSI comprises the precoder that is based at least in part on expected orthogonalization of the CSI at the network node.

3. The UE of claim 2, wherein the one or more processors are further configured to identify the precoder based at least in part on:
an orthogonalization performed on one or more candidate precoders to identify an estimated orthogonalized output of the one or more candidate precoders, and
selection of one or more of the precoder, a rank index (RI), or a channel quality indicator (CQI) based at least in part on the estimated orthogonalized output of the one or more candidate precoders.

4. The UE of claim 1, wherein the one or more processors are further configured to receive an indication that the network node is to perform orthogonalization of CSI, wherein the at least one of the plurality of channel metrics is based at least in part on expected orthogonalization of the CSI at the network node based at least in part on reception of the indication that the network node is to perform the orthogonalization of the CSI.

5. The UE of claim 1, wherein the one or more processors are further configured to transmit an indication of support for transmitting the compressed CSI report that comprises the at least one of the plurality of channel metrics that is based at least in part on expected orthogonalization of the CSI at the network node, wherein the at least one of the plurality of channel metrics is based at least in part on the expected orthogonalization of the CSI at the network node based at least in part on transmission of the indication of support for transmitting the compressed CSI report that comprises the at least one of the plurality of channel metrics that is based at least in part on the expected orthogonalization of the CSI at the network node.

6. The UE of claim 1, wherein the orthogonalization of the compressed CSI report at the network node comprises:
performance of an orthogonalization procedure, on one or more of the plurality of channel metrics, within an additional machine learning model at the network node, or
performance of the orthogonalization procedure, on one or more of the plurality of channel metrics, on an output of the additional machine learning model at the network node.

7. The UE of claim 1, wherein a compression loss metric comprises:
an indication of compression loss between compression and reconstruction of the CSI report, or
an indication of compression loss between compression and orthogonalization of the CSI report.

8. The UE of claim 1, wherein the at least one of the plurality of the channel metrics comprises a precoder.

9. The UE of claim 8, wherein the precoder is a non-optimal precoder based at least in part on identification of an estimated orthogonalization output of a reconstruction of candidate precoders at the network node.

10. The UE of claim 1, wherein the machine learning model is associated with an additional machine learning model at the network node, and wherein association of the additional machine learning model to the machine learning model supports reconstruction of the compressed CSI report.

11. The UE of claim 1, wherein the compressed CSI report comprises one or more of:
a channel quality indicator (CQI),
a rank index (RI), or
an indication of the machine learning model.

12. The UE of claim 11, wherein one or more of the CQI or the RI is associated with an estimation of the expected orthogonalization of the compressed CSI report.

13. A network node for wireless communication, comprising:
a memory; and
one or more processors, coupled to the memory, configured to:
transmit one or more channel state information (CSI)-reference signals (RSs); and
receive a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at the network node, wherein the compressed output of the machine learning model comprises a compressed precoder, and wherein the orthogonalization of the compressed CSI report restores orthogonality of the compressed precoder.

14. The network node of claim 13, wherein the one or more processors are further configured to:

generate a reconstruction of a precoder based at least in part on reconstructing the compressed CSI report.

15. The network node of claim 14, wherein the one or more processors are further configured to:

generate an orthogonalization of one or more of the reconstruction of the precoder or the at least one of one or more additional channel metrics.

16. The network node of claim 15, wherein the one or more processors, to generate the orthogonalization of the precoder, are configured to:

perform an orthogonalization procedure, on one or more of the plurality of channel metrics, within an additional machine learning model at the network node, or perform the orthogonalization procedure, on one or more of the plurality of channel metrics, on an output of the additional machine learning model at the network node.

17. The network node of claim 13, wherein the one or more processors are further configured to transmit an indication that the network node is to perform orthogonalization of CSI, wherein the at least one of the plurality of channel metrics is based at least in part on expected orthogonalization of the CSI at the network node based at least in part on transmission of the indication that the network node is to perform the orthogonalization of the CSI.

18. The network node of claim 13, wherein the one or more processors are further configured to receive an indication of support for transmitting the compressed CSI report that comprises the at least one of the plurality of channel metrics that is based at least in part on expected orthogonalization of the CSI at the network node, wherein the at least one of the plurality of channel metrics is based at least in part on the expected orthogonalization of the CSI at the network node based at least in part on reception of the indication of support for transmitting the compressed CSI report that comprises the at least one of the plurality of channel metrics that is based at least in part on the expected orthogonalization of the CSI at the network node.

19. The network node of claim 13, wherein a compression loss metric comprises:

an indication of compression loss between compression and reconstruction of the CSI report, or an indication of compression loss between compression and orthogonalization of the CSI report.

20. The network node of claim 13, wherein the at least one of the channel metrics comprises a precoder.

21. The network node of claim 20, wherein the precoder is a non-optimal precoder based at least in part on an estimated orthogonalization output of a reconstruction of candidate precoders at the network node.

22. The network node of claim 13, wherein the machine learning model is associated with an additional machine learning model at the network node, and wherein association of the additional machine learning model to the machine learning model supports reconstruction of the compressed CSI report.

23. The network node of claim 13, wherein the compressed CSI report comprises one or more of:

a channel quality indicator (CQI), a rank index (RI), or an indication of the machine learning model.

24. The network node of claim 23, wherein one or more of the CQI or the RI is associated with an estimation of the expected orthogonalization of the compressed CSI report.

25. A method of wireless communication performed by a user equipment (UE), comprising:

receiving one or more channel state information (CSI)-reference signals (RSs); and transmitting a compressed CSI report that comprises an indication of a plurality of channel metrics, an indication of a channel metric of the plurality of channel metrics comprising a compressed output of a machine learning model having an input as the channel metric, wherein at least one of the plurality of channel metrics is based at least in part on expected orthogonalization of the compressed CSI report at a network node, wherein the compressed output of the machine learning model comprises a compressed precoder, and wherein the orthogonalization of the compressed CSI report restores orthogonality of the compressed precoder.

26. The method of claim 25, further comprising:

performing channel estimation based at least in part on the one or more CSI-RSs; and identifying a precoder based at least in part on the channel estimation, wherein the at least one of the plurality of channel metrics for CSI comprises the precoder that is based at least in part on expected orthogonalization of the CSI at the network node.

27. The method of claim 25, further comprising receiving an indication that the network node is to perform orthogonalization of CSI, wherein the at least one of the plurality of channel metrics is based at least in part on expected orthogonalization of the CSI at the network node based at least in part on receiving the indication that the network node is to perform the orthogonalization of the CSI.

28. A method of wireless communication performed by a network node, comprising:

transmitting one or more channel state information (CSI)-reference signals (RSs); and receiving a compressed CSI report that comprises an indication of a plurality of channel metrics, an indication of a channel metric of the channel metrics comprising a compressed output of a machine learning model having an input as the channel metric, wherein at least one of the plurality of channel metrics is based at least in part on expected orthogonalization of the compressed CSI report at the network node, wherein the compressed output of the machine learning model comprises a compressed precoder, and wherein the orthogonalization of the compressed CSI report restores orthogonality of the compressed precoder.

29. The method of claim 28, further comprising:

generating a reconstruction of a precoder based at least in part on reconstructing the compressed CSI report.

30. The method of claim 29, further comprising transmitting an indication that the network node is to perform orthogonalization of the CSI, wherein the at least one of the plurality of channel metrics is based at least in part on expected orthogonalization of the CSI at the network node based at least in part on transmitting the indication that the network node is to perform the orthogonalization of the CSI.

\* \* \* \* \*